United States Patent [19]

Van der Valk

[11] 4,241,362
[45] Dec. 23, 1980

[54] CIRCUIT FOR INCREASING A SIGNAL SLOPE OF A PERIODICALLY OCCURRING SIGNAL MAINLY NEAR A REFERENCE LEVEL

[75] Inventor: Nicolaas J. L. Van der Valk, Breda, Netherlands

[73] Assignee: U.S. Philips Corporation, New York, N.Y.

[21] Appl. No.: 960,527

[22] Filed: Nov. 14, 1978

[30] Foreign Application Priority Data

Dec. 27, 1977 [NL] Netherlands ............... 7714398

[51] Int. Cl.$^3$ ............................................. H04N 9/53
[52] U.S. Cl. ......................................... 358/32; 358/164;
307/229; 328/142
[58] Field of Search ............... 358/32, 164, 160, 37;
307/229, 230; 328/142, 143

[56] References Cited

U.S. PATENT DOCUMENTS

| | | | |
|---|---|---|---|
| 3,793,480 | 2/1974 | Waehner | 358/164 |
| 4,018,988 | 4/1977 | Seer, Jr. | 358/164 |
| 4,041,531 | 8/1977 | Bingham | 358/37 |

Primary Examiner—Richard Murray
Attorney, Agent, or Firm—Thomas A. Briody; William J. Streeter; Edward W. Goodman

[57] ABSTRACT

A circuit for increasing, mainly near a reference level, a signal slope of a periodically occurring signal, particularly at the black level of a television picture signal. To this end the gamma-corrected and limited luminance signal is applied in a color television camera to a first input of a differential amplifier, a second input of which is connected to a reference potential, the amplifier output being connected via a signal limiting circuit arranged in series with a first and a second resistor, respectively, to the first amplifier input and the reference potential, respectively. The junction of the resistors supplies the correction signal which increases the signal slope but does not effect either the black level or the peak-white value.

5 Claims, 1 Drawing Figure

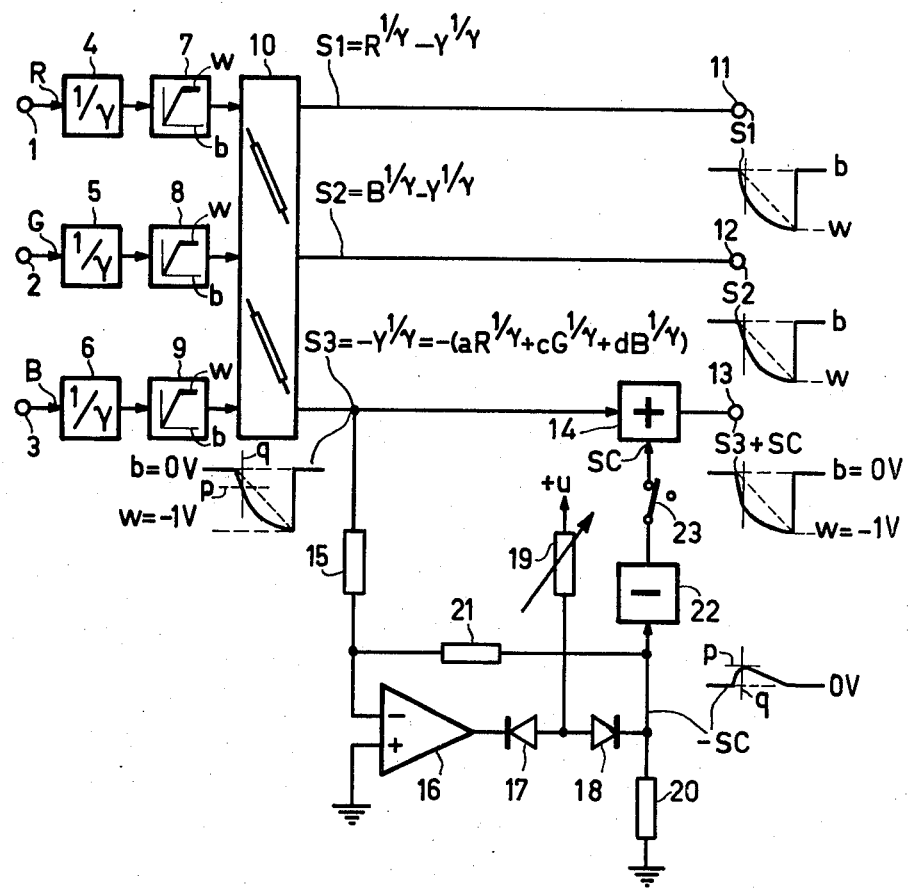

CIRCUIT FOR INCREASING A SIGNAL SLOPE OF A PERIODICALLY OCCURRING SIGNAL MAINLY NEAR A REFERENCE LEVEL

BACKGROUND OF THE INVENTION

The invention relates to a circuit for increasing, mainly near a reference level, a signal slope of a periodically occurring signal.

Such a circuit may, for example, be used in television. Herein it is customary to apply gamma correction to a television picture signal to match the linear opto-electronic recording characteristic to the non-linear electro-optical display characteristic. Besides this gamma correction, between a black level, fixed at a reference level, and a fixed peak-white value in the picture signal, it is advantageous to apply a further correction, that is to say a further increase of the signal slope specifically near the reference black level.

SUMMARY OF THE INVENTION

It is an object of the invention to provide a circuit suitable therefor and implemented in a very simple manner. A circuit according to the invention is characterized in that the circuit comprises a differential amplifier provided with a first and a second input, respectively, for the supply of the signal to be processed and a reference potential, the amplifier output being connected, via a signal limiting circuit, to the junction of a first and a second resistor, which are connected, respectively, to the first amplifier input and the reference potential, this junction being connected to an input of a superposition stage provided with having another input for the supply of the signal to be processed and an output for supplying a signal with an increased slope.

To obtain a signal slop-increasing correction signal which does not affect a predescribed peak-to-peak value of the signal to be processed, the circuit is characterized in that the first input of the differential amplifier is connected to the output of the signal limiting circuit for obtaining a peak value, fixed relative to the reference level, in the signal to be processed.

The circuit, comprising a simple adjustment for generating a correction signal which does not affect a predescribed peak-to-peak value of the signal to be processed, is characterized in that the signal limiting circuit is provided with two diodes, which are arranged in series with opposite pass directions, the diode junction of which is connected to a power supply terminal via a variable resistor.

For selectively performing the corrective signal processing, the circuit is characterized in that it comprises an on-off switch arranged in series with the differential amplifier.

For use in a color television camera, the circuit is present provided in a luminance channel subsequent to a matrix circuit, inputs of the matrix circuit being connected to outputs of separate series arrangements, each consisting of a gamma correction circuit and a signal limiting circuit.

DESCRIPTION OF THE DRAWINGS

The invention will be further explained by way of non-limitative example with reference to the accompanying FIGURE in which a portion of a television camera circuitry is shown incorporating the invention.

DESCRIPTION OF THE PREFERRED EMBODIMENT

In the FIGURE reference numerals 1, 2 and 3 denote three signal inputs to which signals R, G and B are applied, respectively. The signals R, G and B are, for example, the color signals produced in a color television camera representing the red, green and blue color information, respectively, present in a televized scene. Each of the signal inputs 1, 2 and 3 is connected via a series arrangement of a gamma correction circuit 4, 5 and 6, respectively, and a signal limiting circuit 7, 8 and 9, respectively, to one of three inputs of a matrix circuit 10. the implementation of the gamma correction circuits 4, 5 and 6 is not relevant to the invention, so that it is not further discussed. The same applies to the implementation of the limiting circuits 7, 8 and 9, it only being indicated in the FIGURE that, considered from a reference level b, passing the signal is effected to a peak value w. For television especially, it follows that the reference level b represents the black level and the peak value w the peak white value.

The matrix circuit 10 is implemented in one of the known manners and includes, for example, resistors and signal amplifiers. The matrix circuit 10 forms signal combinations from the gamma-corrected color signals $R^{1/\gamma}$, $G^{1/\gamma}$ and $B^{1/\gamma}$, the FIGURE showing signals $S1=R^{1/\gamma}-Y^{1/\gamma}$ and $S2=B^{1/\gamma}-Y^{1/\gamma}$ as color difference signals and a signal $S3=-Y^{1/\gamma}=-(aR^{1/\gamma}+cG^{1/\gamma}+dB^{1/\gamma})$ as the (inverted) luminance signal. By way of example it holds that: $a=0.30$, $c=0.59$ and $d=0.11$. From the matrix circuit 10 the signals S1 and S2 become available at outputs 11 and 12 for further processing in the color television camera.

The signal S3 to be processed is not supplied directly at an output 13 but via a superposition stage 14, to an input of which a correction signal SC is also applied, so that the output 13 carries a corrected signal $S3+SC$. The waveforms of the respective signals S1, S2 and $S3+SC$ are shown in the FIGURE near the outputs 11, 12, and 13 respectively. To emphasize the difference between, on the one hand, the signals S1 and S2 and, on the other hand, the signal $S3+SC$, S1, S2 and S3 are shown with the same signal shape, as far as possible. By way of illustration, reference is made to the signal S3, shown at the output of the matrix 10, which is assumed to be identical to the signals S1 and S2. For the periodically occurring signals S1, S2 and S3 it is assumed that they vary during line scanning periods between the black level b (reference potential $b=0V$) and the peak-white value w (where $w=-1V$).

The signal S3 is present as a luminance signal in the luminance channel subsequent to the matrix circuit 10, which luminance channel includes inter alia the superposition stage 14. In addition, the signal S3 to be processed is applied to a terminal of a resistor 15 whose other terminal is connected to an inverting input of a differential amplifier 16, a non-inverting input thereof being connected to ground as the reference potential. The output of the amplifier 16 is connected to the cathode of a diode 17, the anode thereof being connected to the anode of a diode 18 and, via a variable resistor 19, to a terminal having a supply voltage $+u$. The cathode of the diode 18 is connected, via a resistor 20, to ground as the reference potential and, via a resistor 21, to the inverting input of the amplifier 16. The junction of the diode 18 and the resistors 20 and 21, carrying a correction signal $-SC$ shown in the drawing, is connected to the input of an inverting stage 22, the output of which is connected via an on-off switch 23 to the input, of the superposition stage 14. Thus an amplifier circuit (15-21) is formed wherein a limiting circuit (17, 18, 19) is incorporated.

The following should be noted as an explanation of the operating of the circuit (14-23) for increasing the signal slope in the signal S3 mainly near the black level b. When the black level b=O V is present in the signal S3, that is to say in the presence of a ground potential at the inverting input of the amplifier 16, this black level is also present at the cathode of the diodes 17 and 18, in which situation the diode 18 is non-conducting and the diode 17 conducts and carries all the current flowing through the resistor 19. The resistors 15, 20 and 21 are not carrying any current. A small negative voltage in the signal S3 then results, if a gain factor equal to minus one is assumed for the amplifier circuit (15-21), in an equally positive voltage at the output of the amplifier 16, which is present with the same value at the cathode of the diode 18. It appears that the correction signal −SC follows, in an inverted sense, the signal S3. In case of a larger negative voltage in the signal S3, denoted by p, the voltage at the output of the amplifier 16 and at the cathode of the diode 17 connected thereto has become so highly positive that the diode 17 is cut-off and the whole current passing through the resistor 19 flows through the diode 18 at whose cathode the positive voltage, denoted by p in the waveform for −SC, is then present. A further negative increase of the voltage in the signal S3 results in a higher voltage, than the voltage denoted by p in the signal −SC, at the output of the amplifier 16, but due to the fact that diode 17 is cut-off, this increase in voltage has no more influence; the feedback circuit from the output of the amplifier 16 to the inverting input is interrupted. The voltage denoted by p in the signal −SC, along with the negative voltage in the signal S3, results in that the resistor 21 starts carrying a current which is higher in proportion as the current of resistor 20 is lower. The drawing shows that in the signal −SC the decrease in current is effected by the resistor 20 from the moment q onwards. When the peak-white value w=−1V is attained in the signal S3, the voltage in the signal −SC becomes equal to the ground potential; this is the result of a previous adjustment of the variable resistor 19. The resistor 19 is adjusted so that with a voltage of −1V in the signal S3 the current flowing through the resistor 19 and the diode 18 results in the ground potential at the cathode of the diode 18. In the described manner the signal −SC, shown in the drawing, is produced from the signal S3. By way of illustration it follows that, different from the signals S3 and SC schematically shown in the FIGURE, the value p is, for example, 10% of the peak-to-peak value (w - b), which value is, for example, present at q equal to 5% of the linear signal variation, shown by means of a dotted line, between b=OV and the jump back to b=OV at w=−1V.

Comparing the signals S1, S2 and S3+SC shows that the processed luminance signal S3+SC has obtained an increase of the signal slope near the black level b. On display, this results in that brightness gradations near the black level, that is to say in the dark picture portions, are emphasized without color shifts. Depending on the displayed scene this emphasis may be either desired or not desired, so that the on-off switch 23 has been provided to enable this choice.

By way of illustration some values are now given for a practical implementation of the circuit:

resistor 15: 1 kΩ
resistor 19: 22 kΩ at a maximum
resistor 20: 440 Ω
resistor 21: 2.2 kΩ
voltage+u: +5 V.

What is claimed is:

1. A circuit for increasing, mainly near a reference level, a signal slope of a periodically occurring signal, wherein the circuit comprises a differential amplifier provided with a first and a second input to which the supply of the signal to be processed and a reference potential, respectively, and supplied, and an output; a first signal limiting circuit connected to said amplifier output; a first and a second resistor arranged serially and connected at the junction thereof to said first signal limiting circuit, said first and second resistors being connected respectively to the first amplifier input and the reference potential; and a superposition stage having a first input connected to said junction and a second input for receiving the signal to be processed, and an output for supplying the signal with the increased signal slope.

2. A circuit as claimed in claim 1, wherein the first input of the differential amplifier is coupled to the output of a second signal limiting circuit for obtaining a peak value, fixed relative to the reference level, in the signal to be processed.

3. A circuit as claimed in claim 1 or 2, wherein the first signal limiting circuit comprises two diodes, which are arranged in series with opposite pass directions, and a variable resistor connecting the diode junction to a power supply terminal.

4. A circuit as claimed in claim 3 wherein the circuit further comprises an on-off switch arranged in series with the differential amplifier.

5. A circuit as claimed in claim 1 suitable for use in a color television camera, wherein the circuit is present in a luminance channel subsequent to a matrix circuit, inputs of the matrix circuit being connected to outputs of series arrangements, each consisting of a gamma correction circuit and a signal limiting circuit.

* * * * *